April 5, 1955 M. DENIS 2,705,777

COMPENSATING DEVICE FOR PHASE VARIATIONS IN LONG ULTRA HIGH FREQUENCY LINES

Filed April 4, 1951 2 Sheets-Sheet 1

Inventor:
Marcel Denis
By: Michael S. Striker
Agt

Inventor:
Marcel Denis
By: Michael S. Striker
Agt

United States Patent Office 2,705,777

Patented Apr. 5, 1955

2,705,777

COMPENSATING DEVICE FOR PHASE VARIATIONS IN LONG ULTRA HIGH FREQUENCY LINES

Marcel Denis, Paris, France, assignor to Compagnie Generale de Telegraphie Sans Fil, a corporation of France Application April 4, 1951, Serial No. 219,167

Claims priority, application France April 25, 1950

3 Claims. (Cl. 333—33)

The present invention relates to a device for correcting or compensating phase variations which occur in relatively long ultra-high frequency transmission lines.

In the transmitters which use frequency modulated short waves, for example centimetric waves, it is sometimes necessary to connect a generator, such as a self oscillating tube, to an energy radiating device, this junction being effected by means of a high frequency line of a certain length and usually constituted by a coaxial cable or by a hollow guide. As the frequency produced by the generator varies within a certain range, by reason of the modulation, the whole of the radiating device including the line cannot, at any given moment, be perfectly matched to the self oscillator owing to the existence of a small reflection coefficient at the junction between the line and that radiating device. The result is that reflections are produced and waves come back towards the generator, thus causing disturbances in its operation, for example producing an increase in the non-linear distortion.

The object of the present invention is to provide a compensating device destined to be inserted in the high frequency line, close to the generator, and which permits considerably to decrease that distortion, whatever be the frequency and the modulation depth, at least over some range.

According to a first feature of the invention, the compensating device is constituted by a section of wave guide divided into two branches of different lengths, selecting means being provided to divide the transmitted wave among these two branches, in a proportion varying with the instantaneous frequency of that wave.

According to another feature of the invention, the selecting means are constituted by two energy collecting elements such as antennas, respectively disposed at the entrance of both branches, each of these elements being connected to a resonator, both units, each composed of a resonator and its connection to the energy collecting element, being such as to present different response curves in relation with the instantaneous frequency of the transmitted wave.

According to one embodiment of the invention, both resonators may be identical, but joined to their respective antennas by sections of high frequency line of different lengths.

According to another embodiment of the invention, both energy collecting elements can be connected to one resonator only, by two respective high frequency lines of different lengths.

The invention will be better understood with the help of the following description, referring to the enclosed drawings in which.

Figures 6A, 6B, 7:
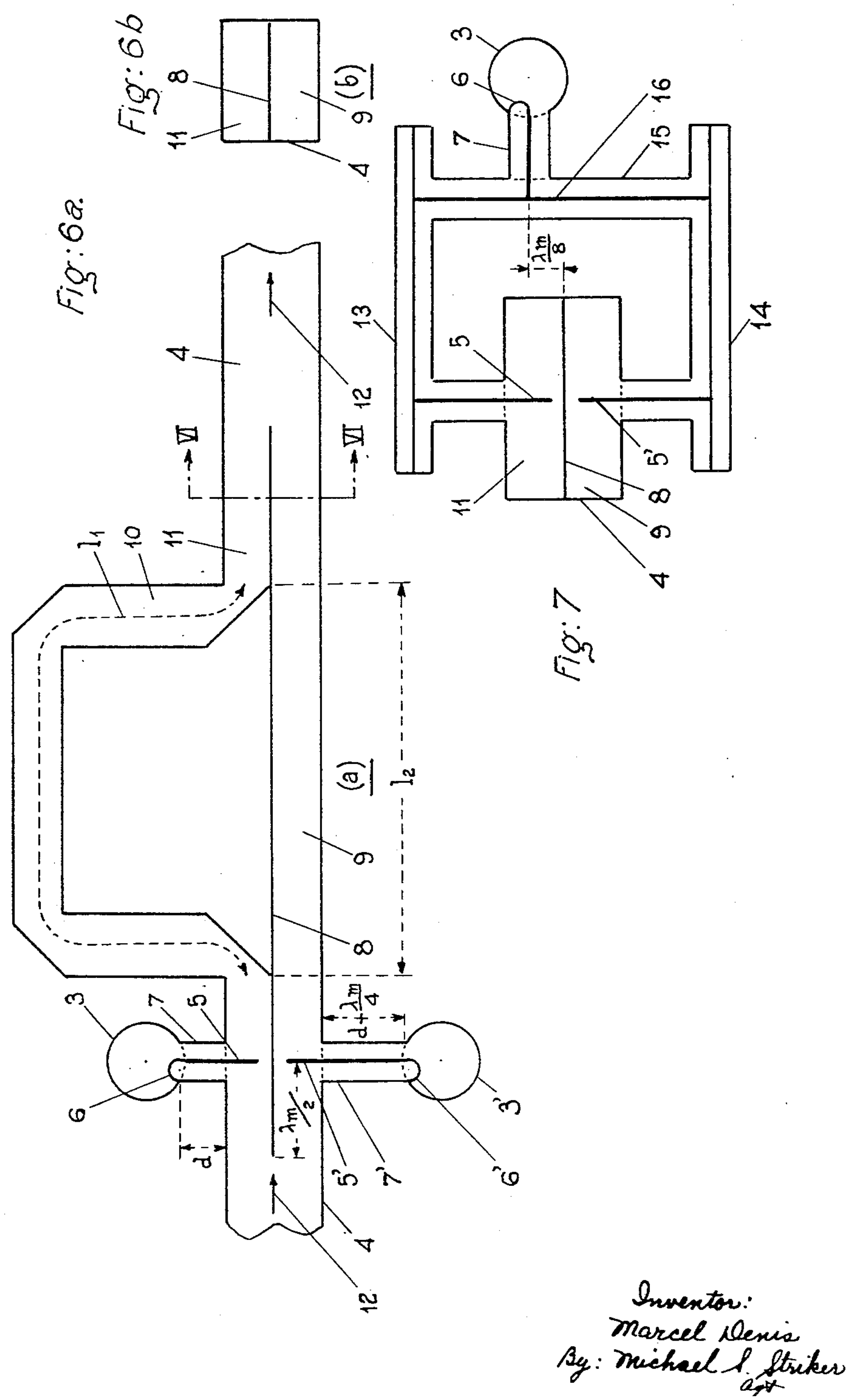

Figures 6*a* and 6*b* are an axial section and a cross-section of a first embodiment according to the invention, in which two antennas are each one associated with a resonator; and Figure 7 is a cross-section of a second embodiment in which both antennas are associated with only one resonator.

Figures 1, 2:
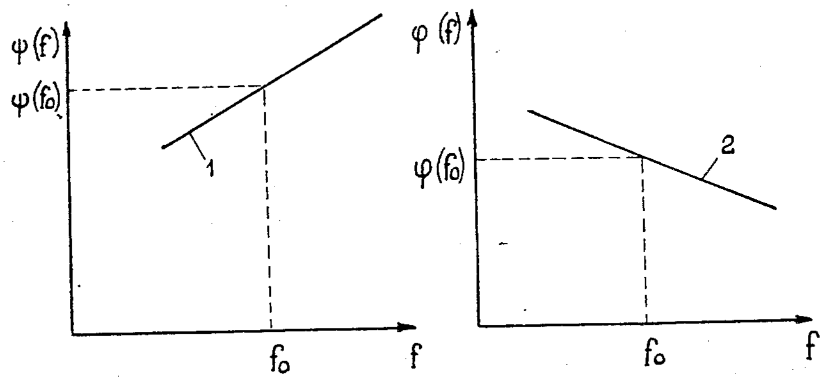
Figures 1 and 2 are graphs explaining the basic principle of the invention.

The following will explain, at first, the principle of the compensation obtained by the device according to the invention, with reference to Figures 1 and 2.

It is known that the instantaneous frequency of a frequency modulated generator generally depends, on the one hand, upon the instantaneous value of the modulating signal, and on the other hand, upon the value of the impedance of the load to which that generator feeds energy.

If, for example, we consider the case of a tube feeding into a long transmission line supposed to be nondispersive and ended by a load having a small reflection coefficient K, the impedance, measured at the line entrance, can be written in first approximation:

$$Z=Z_0\left(1-2jK\sin\frac{4\pi fl}{c}\right)$$

in which:

$l$ is the length of the line
$c$ is the phase velocity
$Z_0$ is the characteristic impedance of the line.

Assuming $f$ varies slowly and at a given moment can be written $f_0+\Delta f_i$, where $f_0$ is the average value of $f$, and $\Delta f_i$ is the variation starting from $f_0$, the reactive part R of the impedance Z takes the form:

$$R=-j2Z_0K\sin\left(\frac{4\pi f_0 l}{c}+\frac{4\pi\Delta f_i l}{c}\right)$$

Developing that expression, $\Delta f_i$ being usually small as compared with $f_0$, it will be found that R varies like $$\sin\frac{4\pi\Delta f_i l}{c}$$

If the time of transmission along the line is represented by $t_0$, it can be written:

$$\sin\frac{4\pi\Delta f_i l}{c}=\sin 4\pi t_0\Delta f_i$$

It may be seen that the disturbances introduced by the line are reproduced periodically for deviations of frequency $\Delta f_i$ whose value is $$\frac{1}{2t_0}$$

The line, the effect of which has to be corrected, introduces a shift of phase $\psi$, in relation with the frequency, whose value is:

$$\psi(f)=\psi(f_0)+\frac{2\pi l}{c}(f-f_0)$$

this linear law valuable within a certain range being represented by the straight line 1 on Figure 1.

Now, let us suppose that, between the generator and the line, we have inserted an auxiliary artificial line whose characteristic impedance is equal to $Z_0$ and which is characterized in the useful band-pass by a law of phase such as $$\varphi(f)=\varphi(f)_0+A(f-f_0)$$

where A is a constant, this variation with relation to $f$ being represented by the straight line 2 of Figure 2. Under these conditions, the total shift of phase $D(f)$ introduced by the whole of the transmission line and of the auxiliary line will be the sum of $\psi(f)+\varphi(f)$ which is:

$$D(f)=\psi(f_0)+\varphi(f_0)+\left(A+\frac{2\pi l}{c}\right)(f-f_0)$$

or $$D(f)=D(f_0)+\left(A+\frac{2\pi l}{c}\right)(f-f_0)$$

In the band-pass to be transmitted, should the factor $$A+\frac{2\pi l}{c}$$

be null, the shift of phase introduced would be constant and equal to D ($f_0$) for all component frequencies.

It is understood that it would be easy to demonstrate that, under these conditions, the impedance measured at the entrance of that unit should be constant and independent from the frequency, at least in the range where the relation $$A+\frac{2\pi l}{c}=0$$

is satisfied, which is made material by the fact that the straight lines 1 and 2 of Figures 1 and 2 may have equal slopes and contrary signs. Under these conditions, the distortion effect of the transmission line would be corrected.

According to the invention, this result is obtained by using two impedances called "inverse" one with respect to the other, therefore whose product is a real quantity. At one end of the band-pass to be transmitted, $Z_1$ must be very large and $Z_2$ nearly null; at the other end of the same band-pass, $Z_1$ must be nearly null and $Z_2$ very large. These conditions are realized by using the transforming properties of the quarter wave lines.

Figure 3:
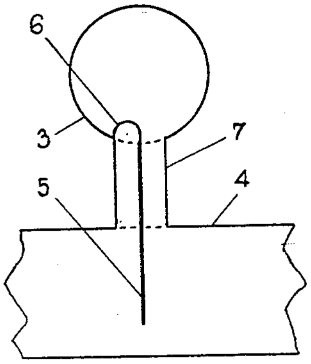
Figure 3 shows a resonator associated with an antenna disposed in a guide, the whole constituting one of the elements used in the device according to the invention.
Figure 4:
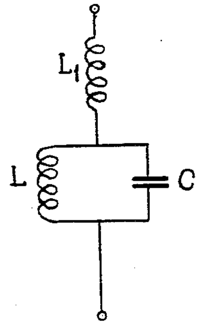

Referring to Figure 3, there is shown a cavity, a resonator 3 strongly coupled by a probe 5 and a loop 6 to the electric field of a rectangular guide 4 in which the wave $H_{01}$ travels, the junction being effected by means of a coaxial cable 7. For a convenient dimension of the loop and for a certain value of the length of cable 7, the equivalent impedance seen from the guide can be exactly represented by the diagram of Figure 4 where an inductance $L_1$ is in series with the circuit of an inductance L and a capacitor C mounted in parallel. The difference between the resonance frequency and the anti-resonance frequency is brought to a convenient value by simultaneously modifying the sizes of the loop 6 and the coupling between that loop and the cavity whose proper Q is supposed to be high enough so that the losses are negligible. Finally, the device of Figure 3 provides the impedance $Z_1$.

Figure 5:
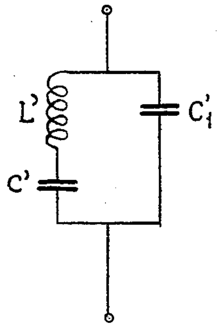
Figures 4 and 5 are equivalent diagrams in the low frequency range, for the purpose of illustrating the operation of the device of Figure 3.

According to the invention, the impedance $Z_2$ inverse of $Z_1$, is obtained by means of a device similar to the one of Figure 3, but in which the length of the coaxial cable 7 is increased by $$\frac{\lambda m}{4}$$

if the average wave length to be transmitted is called $\lambda m$. That impedance can be represented by the diagram of Figure 5, in which the whole of an inductance L′ and a capacitor C′, both mounted in series, is connected in parallel on a capacity $C'_1$.

Referring now to Figures 6*a* and 6*b*, there is seen an example of the device according to the invention. The Figure 6*a* shows that device in longitudinal section, and the Figure 6*b* shows a transverse section on line VI—VI of Figure 6*a*.

The Figure 6*a* shows a guide of rectangular section in which the wave $H_{01}$ travels. On the left, it is joined to a generator, not shown, supplying the frequency modulated wave, and on the right, it is joined to a transmission line, not shown either, which has the same characteristic impedance as the guide, that transmission line leading to an energy radiating device.

Over a certain length, that guide is separated into two parts 9 and 11 by a conducting partition 8, as it is seen on Figure 6*b*. The part 9 of length $l_2$ remains rectilinear, whilst the part 11 includes an elbow of length $l_1$, the difference $l_1-l_2$ corresponding to odd multiples of $$\frac{\lambda m}{2}$$

Both impedances $Z_1$ and $Z_2$ whose part has been explained previously, are constituted by two units according to Figure 3. There are shown two resonators 3 and 3′, constituted for example by two cavities associated with two probes 5 and 5′, which are respectively disposed in both sections of the guide at a distance $$\frac{\lambda m}{2}$$

from the extreme edge of the separating partition 8.

Each one of the resonators is connected to a respective probe by an element of coaxial cable, the length of one, 7′ for example, exceeding the length of the other 7 by $$\frac{\lambda m}{4}$$

If $Z_0$ is the characteristic impedance of the guide, it is evident that the characteristic impedance of each one of the sections 9 and 11 will be $$\frac{Z_0}{2}$$

The high frequency energy progresses as shown by the arrows 12.

Finally, the operation of the device of Figure 6*a* is the following.

The frequency of the wave coming from the generator varies within a certain range. At one end of that range, the probe 5′ opposes an impedance nearly null, and on the contrary, the probe 5 opposes a very high impedance. The wave to be transmitted then passes only through the section 9. At the other end of the range, the conditions are inverse and the transmitted wave effects a turn through the elbow by which the section 11 of the guide is derived.

For intermediate frequencies, particularly for the average frequency, the wave is divided between both ways. According to the above explained principles, the distortions due to faults of matching of the transmission line are compensated.

Figure 7 shows a variation in which both probes 5 and 5′, disposed at the same place as on Figure 6, are associated with a single resonator.

That figure shows the guide 4 in transverse section, divided by the partition 8 into two sections 9 and 11. The probes 5 and 5′ are respectively connected to two identical coaxial cables 13 and 14 which meet in a single coaxial cable 15. The resonator 3 is set at a distance $$\frac{\lambda m}{8}$$

from the middle 16 of the length of the coaxial cable 15. Thus, the distance from the loop 6 to the probe 5′ is longer than the distance from the same loop to the probe 5, the difference between these two distances being of course equal to $$\frac{\lambda m}{4}$$

With only one resonator the same conditions as before are then found again. All the remainder of the device is identical to the whole of Figure 6.

It is evident that, without departing from the object covered by the invention, it would be possible to bring some alterations to the described devices. Particularly, for realizing the impedance $Z_1$, it would be possible to use selective dipoles including several cavities, the choice depending essentially upon the form of the curves of phase shifting that it is desired to obtain.

What I claim is:

1. A phase variation compensating device for use with a transmitter of ultra-high frequency signals frequency-modulated about a central frequency between two extreme frequencies, a receiver for said signals and a single transmission line connecting said transmitter to said receiver, said line being electrically very long as compared to the wavelengths of said extreme frequencies: said device comprising first and second wave guides inserted in parallel in said line between said transmitter and receiver, said second guide having a length differing from that of said first guide by an odd number of half wavelengths of said central frequency, cavity resonator means tuned to one of said extreme frequencies and having zero impedance for said one extreme frequency and an impedance $jZ_0$ for said central frequency as seen from said first guide, $Z_0$ being the characteristic impedance of said line for said central frequency, and first and second coupling means connecting said cavity resonator means respectively to said first and second guides, said second coupling means having a length differing from that of said first coupling means by a quarter wavelength of said central frequency and both said coupling means being connected to said guides at a distance of an odd number of half wavelengths of said central frequency from the point at which said guides are inserted in said line on the transmitter side thereof.

2. A device according to claim 1 in which said cavity resonator means comprise a first cavity resonator connected to said first guide by a first coaxial line and loop, and a second cavity resonator connected to said second guide by a second coaxial line and loop.

3. A device according to claim 1 in which said cavity resonator means comprise a single cavity resonator connected to both said coupling means.

References Cited in the file of this patent

UNITED STATES PATENTS

| | | |
|---|---|---|
| 2,129,669 | Bowen | Sept. 13, 1938 |
| 2,479,697 | Norton | Aug. 23, 1949 |
| 2,531,419 | Fox | Nov. 28, 1950 |
| 2,564,030 | Purcell | Aug. 14, 1951 |
| 2,593,120 | Dicke | Apr. 15, 1952 |
| 2,617,881 | Lewis | Nov. 11, 1952 |
| 2,639,326 | Ring | May 19, 1953 |

OTHER REFERENCES

Tyrrell, "Hybrid Circuits for Microwaves," published November 1947, Proceedings of the I. R. E., pp. 1294–1306.